United States Patent [19]

Grobe et al.

[11] Patent Number: 5,151,193
[45] Date of Patent: Sep. 29, 1992

[54] POLYMER MEMBRANES ON THE BASIS OF POLYVINYLIDENE FLUORIDE, A PROCESS FOR THE PRODUCTION THEREOF AND THEIR USE

[75] Inventors: Anneliese Grobe, Esslingen; Horst Chmiel, Leonberg, both of Fed. Rep. of Germany

[73] Assignee: Fraunhofer-Gesellschaft zur Forderung der Angewandten Forschung EV, Fed. Rep. of Germany

[21] Appl. No.: 613,861

[22] PCT Filed: Feb. 12, 1990

[86] PCT No.: PCT/DE90/00091

§ 371 Date: Nov. 2, 1990

§ 102(e) Date: Nov. 2, 1990

[87] PCT Pub. No.: WO90/09232

PCT Pub. Date: Aug. 23, 1990

[30] Foreign Application Priority Data

Feb. 15, 1989 [DE] Fed. Rep. of Germany ....... 3904544

[51] Int. Cl.$^5$ .............................. B01D 69/00
[52] U.S. Cl. .................................. 210/651; 210/490; 210/500.41; 210/500.42; 264/41
[58] Field of Search ............. 210/490, 500.42, 500.41, 210/500.23, 651, 652; 427/245, 246; 264/41, 49

[56] References Cited

U.S. PATENT DOCUMENTS 4,810,384 3/1989 Fabre ..................... 210/500.42 X
4,990,252 2/1991 Tomaschke et al. ...... 210/500.41 X Primary Examiner—Frank Spear
Attorney, Agent, or Firm—Ostrolenk, Faber, Gerb & Soffen

[57] ABSTRACT

The present invention relates to polymer membranes on the basis of polyvinylidene fluoride (PVDF), a process for the production thereof and their use for ultrafiltration. The membranes are produced according to known techniques from homogeneous solutions containing 5 to 30% by weight of PVDF and 0.01 to 30% by weight of sulfonic acids and/or their salts, obtainable by sulfonation of the polyetheretherketones of formula (I) and/or subsequent neutralization of the sulfonic acids. The membranes are then treated with methanolic solutions containing 0.1 to 5% by weight of the above-mentioned sulfonic acids and/or their salts. This process supplies membranes having excellent hydrophilic properties, high thermal and mechanical stabilities and high transmembrane flows.

$$-(-O-p-C_6H_4-O-p-C_6H_4-CO-p-C_6H_4-)_n- \quad (I)$$

35 Claims, No Drawings

POLYMER MEMBRANES ON THE BASIS OF POLYVINYLIDENE FLUORIDE, A PROCESS FOR THE PRODUCTION THEREOF AND THEIR USE

FIELD OF THE INVENTION

The present invention relates to polymer membranes on the basis of polyvinylidene fluoride (PVDF), a process for the production thereof and their use for ultrafiltration.

Ultrafiltrations are carried out predominantly in aqueous systems, so that particularly great demands are made on the mechanical and thermal stability (sterilizability up to 140° C.) of the membranes used for this purpose, their resistance to acids and alkalis, and their accurately adjustable hydrophilic/hydrophobic properties. The polymers formerly used for membrane production cannot meet all of these requirements at the same time; above all, they show good thermal resistance up to about 140° C. but not sufficient mechanical stability.

BACKGROUND OF THE INVENTION

Even though polyvinylidene fluoride (PVDF), a polymer used for membrane production, is thermoresistant up to about 300° C., it develops extremely hydrophobic properties in aqueous systems (EP-A2-0 249 513), which result in poor membrane wettability in aqueous systems. Thus, it was tried to mold polymer solutions into membranes, which contain a hydrophilic polymer, such as polyvinylpyrrolidone (PVP), in addition to the hydrophobic PVDF (EP-A1-0 012 557). However, the PVP amounts needed for the resulting membranes to show sufficient hydrophilic properties are so high that the membranes no longer have the necessary mechanical stability. Furthermore, the water-soluble PVP is washed out of the membrane by water.

It was tried to eliminate this drawback by grafting the PVP onto PVDF membranes by means of radiation rich in energy (A. Niemöller and G. Ellinghorst, Die Angewandte Makromolekulare Chemie 151, No. 2489, 49–67 (1987)). However, as is well known, grafting represents a technically onerous process and also results in a non-uniform distribution of the grafted polymer. This step of grafting PVP onto PVDF membranes leads to an increase in trans-membrane flow by a factor of 3 along with hydrophilicity (water uptake increase of 45% by weight). However, this effect is accompanied by a very special, hardly adjustable, small degree of grafting. If it is exceeded, opposite effects will occur.

It was also tried to increase the hydrophilicity of these membranes and thus their trans-membrane flow by mixing PVDF with polyvinyl acetate and subsequently saponifying the mixture to form water-soluble polyvinyl alcohols (EP-A1-0 012 557). Thus, membranes containing 65% by weight of polyvinyl acetate, based upon the total polymer content of the membrane, have a flow of 41 lm$^{-2}$h$^{-1}$/345 kPa; i.e. 11.8 lm$^{-2}$h$^{-1}$bar$^{-1}$. However, if less than 40% by weight of polyvinyl acetate, based upon the total polymer content of the membrane, are added, membranes will result which have poorer trans-membrane flows than those made of pure PVDF.

Therefore, it is the object of this invention to provide polymer membranes having high thermal and mechanical load-bearing capacity as well as a high degree of hydrophilicity, great trans-membrane flows and a retention capacity of 95% for substances having molecular weights between 700 and 1400.

OBJECT OF THE INVENTION

According to the invention, this problem is solved in that membranes are made of homogeneous solutions L1, containing 5 to 30% by weight of PVDF and 0.01 to 30% by weight of sulfonic acids (PEEKSO$_3$H) and/or their salts, according to known techniques, and the surface of these membranes is subsequently treated with methanolic solutions L2 containing 0.1 to 5% by weight of sulfonic acids PEEKSO$_3$H and/or their salts. The sulfonic acids PEEKSO$_3$H are obtainable, e.g., from special sulfonation of the polyetheretherketones (PEEK, poly(oxy-1,4-phenylene-oxy-1,4-phenylene-carbonyl-1,4-phenylene)) of formula (I), and the corresponding salts are obtained from the sulfonic acids PEEKSO$_3$H by neutralization (X. Jin, M. T. Bishop, Th. S. Ellis and F. E. Krasz, British Polymer Journal 17, No. 1, 4–10 (1985)).

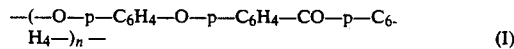

—(—O—p—C$_6$H$_4$—O—p—C$_6$H$_4$—CO—p—C$_6$H$_4$—)$_n$— (I)

Surprisingly, it showed that these minor admixtures result in drastic morphological changes of the submicroscopic PVDF structure (fibrillar) with respect to globular units, which are considered responsible for the increased membrane flow. Polymer membranes produced according to the process of the invention have excellent hydrophilic properties along with high thermal and mechanical stability. They have trans-membrane flows up to 700 lm$^{-2}$h$^{-1}$bar$^{-1}$, a bubble point above 6 bar and a retention capacity up to 95% for substances having molecular weights up to 1300.

DETAILED DESCRIPTION OF THE INVENTION

Preferred embodiments of the process according to the invention use homogeneous solutions L1 containing 5 to 30% by weight of PVDF and 0.01 to 1% by weight of the sulfonic acids PEEKSO$_3$H and/or their salts.

Sulfonic acids PEEKSO$_3$H and/or their salts suitable for carrying out the process according to the invention are obtainable, for example, from polyetheretherketones of formula (I), wherein n may represent values between 35 and 350. Preferred embodiments of the process according to the invention use sulfonic acids and/or their salts, available from polyetheretherketones of formula (I), wherein n represents values between 50 and 300.

Sulfonic acids PEEKSO$_3$H and/or their salts suitable for carrying out the process according to the invention are, for example, those having a sulfur content of 1 to 9% by weight, based upon the sulfonic acid PEEKSO$_3$H. Preferred embodiments of the process according to the invention use sulfonic acids PEEKSO$_3$H and/or their salts having a sulfur content of 2 to 7% by weight, based upon the sulfonic acid PEEKSO$_3$H. Sulfonic acids PEEKSO$_3$H having this sulfur content are, on the one hand, highly hydrophilic and, on the other hand, no longer water-soluble at temperatures of 140° C. (sterilization). As a result, they are not washed out of the membrane, which would result in a change of membrane quality.

Homogeneous solutions L1 suitable for carrying out the process according to the invention contain a solids content of 20 to 40% by weight, and preferred embodiments have a solids content of 30% by weight.

Salts of sulfonic acids PEEKSO$_3$H suitable for carrying out the process according to the invention are, for example, sodium salts PEEKSO$_3$Na and/or ammonium salts PEEKSO$_3$NH$_4$ and/or zinc salts PEEKSO$_3$Zn$\frac{1}{2}$.

Preferred solvents for the production of the homogeneous solutions L1 are dipolar, aprotic, such as dimethylformamide and/or N-methylpyrrolidone and/or dimethylacetamide and/or dimethylsulfoxide. Either a single solvent or mixtures of several solvents may be used.

The modified PVDF solution L1 is produced by suspending the two polymers in the solvent or solvent mixture at temperatures between −40° C. and 25° C. followed by rapid heating to about 80° C. For membrane production, the solutions L1 are further processed according to known processes. For example, they are applied to a polyethylene terephthalate fabric or non-woven fabric attached to a glass plate, expanded by a doctor blade to form a film which is then precipitated to give a membrane in a phase inversion process. Instead of films, other molded bodies, such as hollow filaments, sheets or foams can be produced according to prior art techniques by the processes of the invention; in addition to flat membranes, tubular or capillary membranes can be produced as well.

The membranes can be precipitated at temperatures between −20° C. and +50° C. Water or water/solvent mixtures may be used as the precipitating agent. For this purpose, the solvents are preferably dipolar, aprotic, such as dimethylformamide and/or N-methylpyrrolidone and/or dimethylacetamide and/or dimethylsulfoxide. Preferred embodiments of the process according to the invention use water/solvent mixtures containing 5 to 50% by weight of solvent.

A film, which is made of these sulfonic acids and/or their salts, has a layer thickness between 0.5 and 1 μm and adheres well on this base, is applied to these membranes by means of known processes, such as spraying-on or brushing-on of methanolic solutions L2 containing 0.1 to 5% by weight of the sulfonic acids PEEKSO$_3$H and/or their salts. Hydrophilicity of the membrane surface is further increased by this measure. The sulfonic acids PEEKSO$_3$H and/or their salts suitable for this purpose are the same as those usable for the production of the homogeneous solutions L1. In order to optionally reduce the water-solubility of the membrane surface, it is possible to wet the superficial sulfonic acids PEEKSO$_3$ and/or their salts with Ca$^{++}$ ions.

If small amounts of a surfactant are added to the homogeneous solutions L1, this admixture effects further morphological changes of the submicroscopic structure in the finished membranes. Marked finger structures form, whose lamellae are crisscrossed with cavities. These morphological changes are considered responsible for the increased membrane flow. Preferred embodiments of the process according to the invention use a perfluorooctane sulfonate, such as the tetraethylammoniumperfluorooctane sulfonate of formula (II), as the surfactant.

$$C_8H_{17}SO_3{}^- [N(C_2H_5)_4]^+ \quad \text{(II)}$$

The process according to the invention is explained in more detail by way of the following examples. The membranes were characterized with respect to pore size and distribution in accordance with the bubble point test according to ASTM F 316. The trans-membrane water flow was determined by means of the cell according to Berghof. Membranes wetted with ethanol were used to determine the trans-membrane flow; and moist membranes which were wetted with alcohol and had a diameter of 47 mm were used to determine the bubble point. The measurements were repeated three times using three samples. Gas permeated above a pressure of 6 bar. The sulfonation degree is defined as the number of moles of sulfur per repeating unit.

EXAMPLE 1

16.9 g of PVDF (powder, Aldrich) and 0.1 g of PEEKSO$_3$Na (powder, grain size smaller than 0.5 mm, sulfonation degree 0.7) are heated by stirring (300 r.p.m.) in 83 ml of dimethylformamide (DMF, Fluka, distilled in glass) from −30° C. to 20° C. at a rate of 9° to 11° C./min and from 20° to 80° C. at a rate of 3° C./min and then stirred with 300 r.p.m. at 80° C. for another 10 minutes. Thereafter, bubble-free filtration is slowly carried out through a multi-ply filter consisting of 6 layers of PES fabric with a pressure of 3 to 5 bar.

This solution is spread over a polyethyleneterephthalate fabric (individual titer of the threads is 18.1 Denier, 45 threads, total titer of 816 Denier, 110 g/m$^2$, air permeability 100 l/m$^2$ sec, at a pressure of 20 mm water column), which is attached to a glass plate having a thickness of 3 mm, by a doctor blade with a thickness of 200 μm, and precipitated in deionized water at 4° C. with a residence time of 30 minutes. The next steps are rinsing under deionized running water having a temperature of 10° C. for 18 hours, drying at room conditions and spraying with a solution of 2% by weight of PEEKSO$_3$Na (sulfonation degree 0.7) in methanol.

The bubble point of the membrane produced under these conditions exceeds 6 bar, the water flow is 600 lm$^{-2}$h$^{-1}$ at 1 bar and the retention capacity is 95% with respect to cytochrome C.

EXAMPLE 2

According to Example 1, 17 g of PVDF are dissolved in 83 ml of dimethylformamide and a membrane is made thereof. The bubble point of the membrane exceeds 6 bar, the water flow is 92 lm$^{-2}$h$^{-1}$ at 1 bar, the retention capacity is 36% with respect to cytochrome C.

EXAMPLE 3

18.9 g of PVDF and 0.1 g of PEEKSO$_3$Na are dissolved in 80 ml of DMF and molded into membranes in accordance with Example 1. The bubble point exceeds 6 bar, the water flow is 351 lm$^{-2}$h$^{-1}$ at 1 bar and the retention capacity is 95% with respect to cytochrome C.

EXAMPLE 4

The membranes are produced according to Example 3, but water which is mixed with 15% by weight of dimethylformamide/liter is used as the precipitation bath The bubble point of the membrane exceeds 6, the water flow is 143 lm$^{-2}$h$^{-1}$ at 1 bar.

EXAMPLE 5

19 g of PVDF are dissolved in 81.ml of DMF according to Example 1 and molded into membranes as according to Example 1. These membranes have a bubble point exceeding 6, a water flow of 59 lm$^{-2}$h$^{-1}$ at 1 bar and a retention capacity of 41% with respect to cytochrome C.

EXAMPLE 6

18.9 g of PVDF, 0.1 of PEEKSO$_3$Na and 0.5 of tetraethylammoniumperfluorooctane sulfonate (FT248) are dissolved in 81 ml of DMF and molded into membranes at 4° C. in water containing 0.5 g of FT248/1 according to Example 1. These membranes have a bubble point exceeding 6 bar and a water flow of 679 lm$^{-2}$ h$^{-1}$ at 1 bar and a retention capacity of 95% with respect to cytochrome C.

Commercial Applicability

Depending on the production technique, the polymer membranes produced according to the process of the invention may be used in the most varying fields, e.g. in biotechnology, as ultrafiltration or microfiltration membranes. In addition to high thermal and mechanical stability, they have excellent hydrophilic properties and show trans-membrane flows up to 700 lm$^{-2}$h$^{-1}$bar$^{-1}$, a bubble point exceeding 6 bar and a retention capacity up to 95% for substances having molecular weights up to 1300.

We claim:

1. A process for the production of polymer membranes on the basis of polyvinylidene fluoride (PVDF), wherein a homogeneous solution L1 containing
   a) 5 to 30% by weight of PVDF and
   b) 0.01 to 30% by weight of at least one sulfonic acid (PEEKSO$_3$H) salt obtained by sulfonating the polyetheretherketone (PEEK, poly(oxy-1,4-phenyleneoxy-1,4-phenylene-carbonyl-1,4-phenylene)) of formula (I)

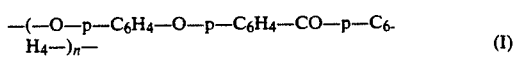

is converted into a membrane by known techniques, and wherein the surface of the membrane is subsequently coated with a film by treating the membrane with a methanolic solution L2 containing 0.1 to 5% by weight of at least one sulfonic acid PEEKSO$_3$H or salt.

2. The process according to claim 1, wherein homogeneous solution L1 contains
   a) 5 to 30% by weight of PVDF and
   b) 0.01 to 1% by weight of the sulfonic acid PEEKSO$_3$H or their salts.

3. The process according to claim 1, wherein sulfonic acid PEEKSO$_3$H or salt used was obtained by sulfonating polyether etherketone PEEK of formula (I), wherein n represents values between 35 and 350.

4. The process according to claim 3, wherein sulfonic acid PEEKSO$_3$H or salt used was obtained by sulfonating polyetherketone of formula (I), wherein n represents values between 50 and 300.

5. The process according to claim 1 wherein the sulfonic acid PEEKSO$_3$H or salts used has a sulfur content of 1 to 9% by weight, based upon the sulfonic acid PEEKSO$_3$H.

6. The process according to claim 5, wherein the sulfonic acid PEEKSO$_3$H or salt used has a sulfur content of 2 to 7% by weight, based upon the sulfonic acid PEEKSO$_3$H.

7. The process according to claim 1 wherein homogeneous solution L1 has a solids content is 20 to 40% by weight.

8. The process according to claim 7, wherein homogeneous solution L1 has a solids content of 30% by weight.

9. The process according to claim 1 wherein the sodium salt PEEKSO$_3$Na of the sulfonic acid PEEKSO$_3$H is used.

10. The process according to claim 1 wherein the ammonium salt PEEKSO$_3$NH$_4$ of the sulfonic acid PEEKSO$_3$H is used.

11. The process according to claim 1 wherein the zinc salt PEEKSO$_3$Zn$_\frac{1}{2}$ of the sulfonic acid PEEKSO$_3$H is used.

12. The process according to claim 1 wherein a dipolar, aprotic solvent is used as the solvent for the homogeneous solution L1.

13. The process according to claim 12, wherein the solvent used is at least one of dimethylformamide, N-methylpyrrolidone, dimethylacetamide and dimethylsulfoxide.

14. The process according to claim 1 wherein 0.25 to 1 g/l of a surfactant is present in homogeneous solution L1.

15. The process according to claim 14, wherein the surfactant is anionic.

16. The process according to claim 15, wherein a perfluorooctane sulfonate is used as the anionic surfactant.

17. The process according to claim 16, wherein the tetraethylammoniumperfluorooctane sulfonate of formula (II)

is used.

18. The process according to claim 1 wherein the membrane is precipitated at temperatures ranging between −20° C. and +50° C.

19. The process according to claim 18 wherein water is used as the precipitating agent for the membrane.

20. The process according to claim 18 wherein a water/solvent mixture is used as the precipitating agent for the membrane.

21. The process according to claim 20, wherein a dipolar, aprotic solvent is used as the solvent.

22. The process according to claim 21, wherein the solvent used is at least one of dimethylformamide, N-methylpyrrolidone, dimethylacetamide and dimethylsulfoxide.

23. The process according to claim 1 wherein a water/solvent mixture having 0 to 50% by weight of solvent is used.

24. The process according to claim 23, wherein a water/solvent mixture having 5 to 50% of solvent is used.

25. The process according to claim 1 wherein methanolic solution L2 contains 0.5 to 2% by weight of the sulfonic acid PEEKSO$_3$H or salt.

26. The process according to claim 1 wherein the methanolic solution L2 is sprayed onto the polymer membrane.

27. The process according to claim 1 wherein the methanolic solution L2 is brushed onto the polymer membrane.

28. The process according to claim 1 wherein the polymer membrane is immersed in the methanolic solution L2.

29. The process according to claim 1 wherein the sulfonic acid PEEKSO$_3$H or salt, present on the membrane surface, is cross-linked with Ca$^{++}$ ions.

30. Polymer membrane produced according to a process as defined in claim 1.

31. The polymer membrane according to claim 30, which is a flat membrane.

32. Polymer membrane according to claim 30, which is a tubular membranes.

33. Polymer membrane according to claim 30, which is a capillary membranes.

34. Polymer membrane according to claim 30, which is a hollow fiber.

35. In a method of ultrafiltration in which the material to be ultrafiltered is passed through an ultrafiltration membrane, the improvement which comprises employing the polymer membrane of claim 30 as the ultrafiltration membrane.

* * * * *